(12) United States Patent
Yasui

(10) Patent No.: US 7,204,903 B2
(45) Date of Patent: Apr. 17, 2007

(54) PRESSURE CONTAINER MANUFACTURING METHOD

(75) Inventor: Shugo Yasui, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 399 days.

(21) Appl. No.: 10/955,689

(22) Filed: Sep. 30, 2004

(65) Prior Publication Data
US 2005/0076995 A1    Apr. 14, 2005

(30) Foreign Application Priority Data
Oct. 3, 2003    (JP) .............................. 2003-345856

(51) Int. Cl.
*B65H 81/00* (2006.01)
(52) U.S. Cl. ...................... 156/149; 156/172
(58) Field of Classification Search ................ 156/148, 156/149, 172, 393
See application file for complete search history.

(56) References Cited
U.S. PATENT DOCUMENTS
3,282,757 A * 11/1966 Brussee ........................ 156/69

| 4,603,084 | A | * | 7/1986  | Drachenberg et al. ...... 428/377 |
| 5,388,497 | A | * | 2/1995  | Akiyama et al. ............... 87/34 |
| 5,476,027 | A | * | 12/1995 | Uchida et al. .................. 87/29 |
| 6,047,756 | A | * | 4/2000  | Uchida ........................ 156/393 |

* cited by examiner

*Primary Examiner*—Jeff H. Aftergut
(74) *Attorney, Agent, or Firm*—Smith, Gambrell & Russell

(57) ABSTRACT

A pressure container manufacturing method by forming an outer shell of a fiber reinforced composite material on a periphery of a liner having a cylindrical portion, dome portions connected to both ends of the cylindrical portion, and a mouth piece disposed on one top of the dome portions, has: forming a body on the periphery by braiding fiber bundles provided from bobbins of a braider disposed in a circumferential direction of the liner, while moving the liner in an axial direction, wherein when body formation reaches a root portion of the mouth piece, a movement in a first direction of the liner is stopped, each bobbin is rotated approximately a half-turn in the circumferential direction, and thereafter formation of the body is continued while moving the liner in a second direction opposite to the first direction; and curing a resin impregnated in the fiber bundles, to form an outer shell.

8 Claims, 2 Drawing Sheets

PRESSURE CONTAINER MANUFACTURING METHOD

BACKGROUND OF THE INVENTION

1. Field of the Invention

The present invention relates to a pressure container manufacturing method and particularly, to a manufacturing method of a pressure container which is reinforced by covering a liner with a fiber reinforced composite material.

2. Description of Related Art

Currently, a pressure container for storing and transporting compressed gas such as CNG (Compressed Natural Gas), CHG (Compressed Hydrogen Gas) or the like, or low temperature gas has been in practical use. Earlier, a pressure container made of metal which has a high strength and is excellent in gas barrier property has been mainstream, however due to its heavy weight, there is a difficulty in applying it to a fuel tank of an automobile or a space plane in which weight saving is required. Therefore, recently, there has been proposed a relatively light weight FRP (Fiber Reinforced Plastics) wrapped pressure container which is made by forming an FRP layer on the outer periphery of a hollow cylindrical liner.

There is a FW (Filament Winding) method as a method to form the FRP layer on the outer periphery of the hollow cylindrical liner. The FW method is a method in which fiber bundles are impregnated with resin beforehand to prepare a tow-shaped prepreg and an FRP layer is formed by winding the tow-shaped prepreg on the liner. Applying the FW method is successful in obtaining an FRP wrapped pressure container which is relatively light in weight and has high strength. However, applying the FW method would raise a problem of requiring a long period of time to wind the tow-shaped prepreg on the liner.

To solve this problem, recently, there has been proposed a braiding method in which a braider is used to form a body on the outer periphery of the liner by braiding a plurality of fiber bundles, and the body is impregnated with resin to be cured to form the FRB layer (for example, refer to JP-Tokukaihei-11-58540A (Page 3, FIG. 4) or JP-Tokukaihei-07-256771A (Page 2, FIG. 2)). Applying the braiding method is successful in shortening the manufacturing time and reducing the manufacturing cost of the pressure container compared with the case of applying the FW method.

However, in the conventional braiding method, the body is formed on the periphery of the liner by supplying a fiber bundle from a plurality of bobbins of a braider which is disposed in a circumferential direction of the liner while moving the liner in an axial direction.

Conventionally, when forming a body on the periphery of the liner in this way, the movement of the liner is stopped when the forming position of the body reaches the root portion of the mouth piece of the liner. After the fiber bundles are cut off, the formation of the body is continued while the liner is moved in a direction opposite to the axial direction. Or alternatively when the forming position of the body reaches the root portion of the mouth piece of the liner, the liner is moved immediately in a direction opposite to the axial direction. After the fiber bundles are crooked greatly so as to be folded back, the formation of the body is continued.

In other words, in the conventional braiding method, when reversing the direction of the movement of the liner, the fiber bundles are cut off or alternatively the fiber bundles are crooked greatly so as to be folded back. For this reason, the FRP layer formed by using the conventional braiding method is lower in strength than the FRP layer formed by using the FW method.

SUMMARY OF THE INVENTION

The present invention is developed in view of the above described problems, and an object of the present invention is to provide a pressure container manufacturing method in which a pressure container which has a high strength and is light in weight can be obtained while suppressing the manufacturing cost, and a pressure container manufactured by the manufacturing method.

For solving the problems, in accordance with a first aspect of the present invention, the pressure container manufacturing method for manufacturing a pressure container by forming an outer shell made of a fiber reinforced composite material on an outer periphery of a liner which has a cylindrical portion, dome portions connected to both ends of the cylindrical portion, and a mouth piece disposed on a top of at least one of the dome portions, comprises: forming a body on the periphery of the liner by braiding a fiber bundle provided from a plurality of bobbins of a braider which is disposed in a circumferential direction of the liner, while moving the liner in an axial direction, wherein when a forming position of the body reaches a root portion of the mouth piece of the liner, a movement in a first direction of the liner is stopped, each of the bobbins is rotated approximately a half-turn in the circumferential direction of the liner, and thereafter formation of the body is continued while moving the liner in a second direction opposite to the first direction; and curing a resin which is impregnated in the fiber bundle, to form an outer shell.

According to the method of the first aspect of the present invention, in the step to form the body on the periphery of the liner by providing the fiber bundles from a plurality bobbins of a braider while moving the liner in an axial direction, a movement in a first direction of the liner is stopped when the forming position of the body reaches the root portion of the mouth piece of the liner. Then by rotating each of the bobbins in the circumferential direction of the liner to arrange each of the bobbins at a position that is approximately opposite to the position before rotation with the mouth piece being interposed therebetween, thereafter the formation of the body is continued in a second direction opposite to the first direction of the liner.

For this reason, like the helical winding system of the FW method, the braiding can be carried out in such a way that the fiber bundles are wound to the dome portion of the liner, eliminating the need to cut off the fiber bundles or alternatively the need to crook the fiber bundles so as to be folded back when reversing the moving direction of the liner. As a result, it is possible to reinforce the strength of the outer shell of the fiber reinforced composite material, further making it possible to reinforce the strength of the tank.

According to the method of the first aspect of the invention, when forming the body on the outer periphery of the liner by providing the fiber bundles from the bobbins of the braider while moving the liner in an axial direction, a movement in a first direction of the liner is stopped when the forming position reaches the root portion of the mouth piece of the liner. The formation of the liner is continued by moving the liner in a second direction opposite to the first direction after each of the bobbins are rotated approximately a half-turn. Therefore, when reversing the moving direction of the liner, the need to cut off the fiber bundles, or alternatively the need to crook greatly the fiber bundles so as to be folded back, is eliminated. As a result, the strength of the outer shell made of a fiber reinforced composite material is reinforced, further making it possible to obtain a pressure container with a high strength while taking full advantage of the merits of the braiding method (i.e. short manufacturing time and low manufacturing cost).

BRIEF DESCRIPTION OF THE DRAWINGS

The invention will become more fully understood from the detailed description given hereinbelow and the accompanying drawings which are given by way of illustrating only, and thus are not intended as a definition of the limits of the invention, and wherein.

DETAILED DESCRIPTION OF THE PREFERRED EMBODIMENTS

Figure 1:
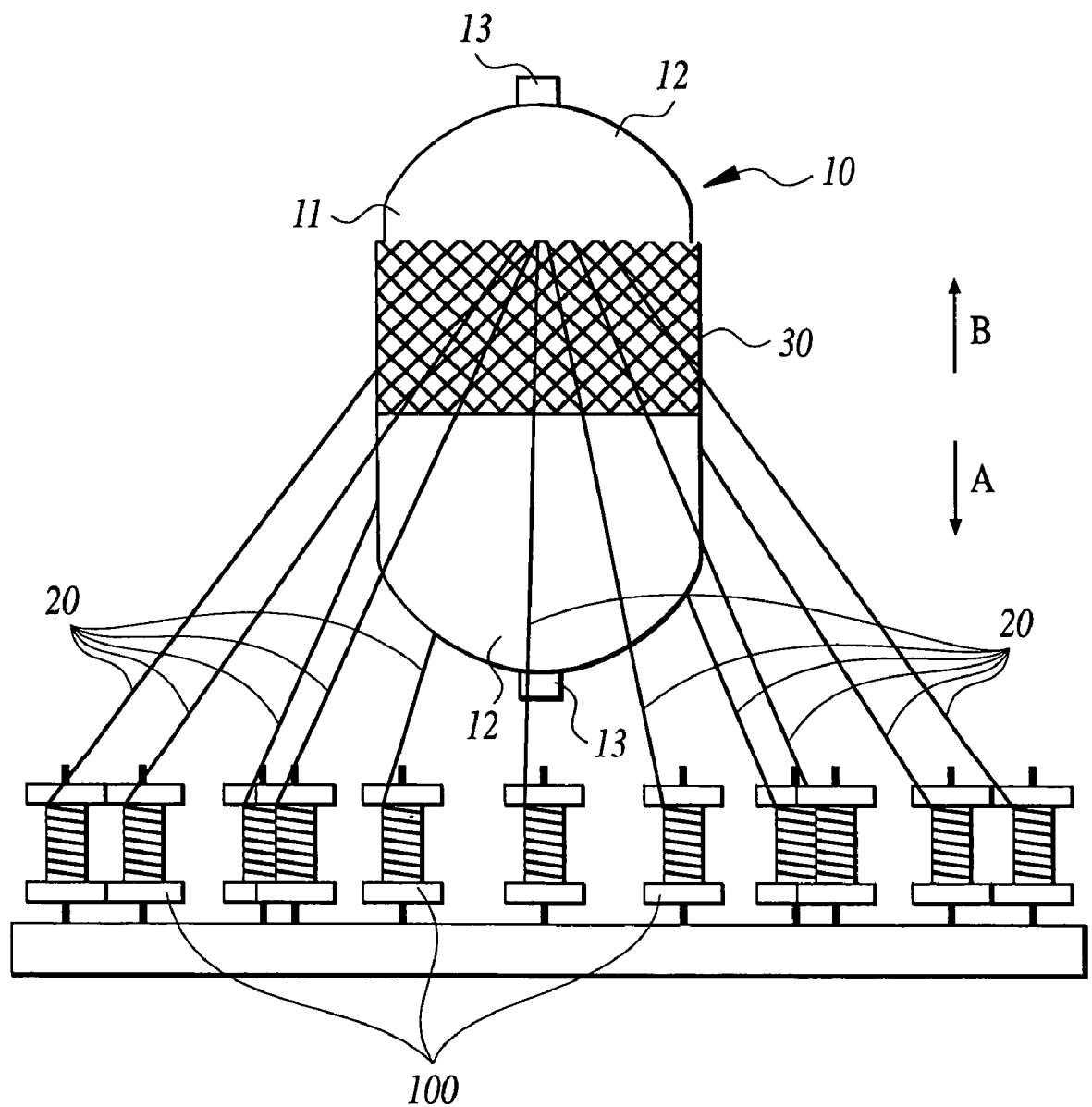
FIG. 1 is a view for explaining a body forming step of the pressure container manufacturing method according to an embodiment in the present invention.
Figure 2:
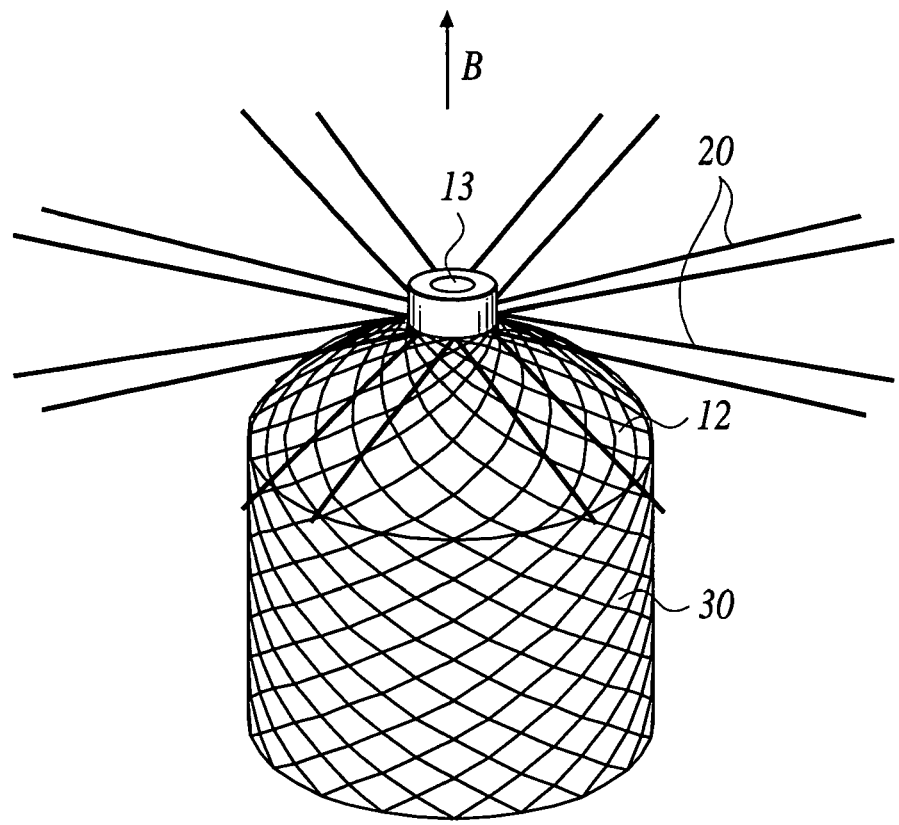
FIG. 2 is a perspective view of a state where a forming position of the body has reached a root of the mouth piece of the liner in accordance with the body forming step of the pressure container manufacturing method in accordance with the invention.

The embodiment of the present invention will be explained hereinbelow referring to the drawings.

In the embodiment, the explanation will be made on a method to manufacture a CNG tank by forming an outer shell made of a fiber reinforced composite material on the outer periphery of the liner 10 (refer to FIG. 1). The tank manufactured by the method according to this embodiment is a pressure container which can be filled with several hundred of atmospheres of gas.

First, the liner 10 is molded by a material which is excellent in gas barrier property (liner molding step). In the embodiment, the liner 10 is molded by a blow molding method using a liquid crystal resin which is superior in dimensional stability and chemical resistance as well as gas barrier property. The liner 10, as shown in FIG. 1, comprises a cylindrical portion 11 and dome portions 12 formed at both ends of the cylindrical portion 11. A metal mouth piece 13 is attached to the top of each dome portion 12.

Next, by braiding a fibrous thermoplastic resin into a carbon fiber bundle made of a plurality of carbon fibers to prepare the fiber bundle 20 (fiber bundle preparing step). The fiber bundle 20 is wound to a bobbin 100 of a braider (refer to FIG. 1) and used in the body forming step which is to be explained later. Polyimide, polyphenylene sulfite, polyethylene terephthalate or the like can be used as a thermoplastic resin which is braided into the fiber bundle 20.

Next, the fiber bundles 20 are continuously provided from the bobbins 100 of the braider arranged around the liner 10 while reciprocating the liner 10 in an axis direction (directions of arrows A and B) as shown in FIG. 1 to braid them, thereby forming a body 30 on the outside of the cylindrical portion 10 and the dome portion 12 of the liner 10 (body forming step).

The procedure of the body forming step will be specifically explained. First, the bundles 20 are provided from the plurality of bobbins 100 arranged along a circumferential direction of the cylindrical portion 11 of the liner 10, and end portions of the fiber bundles are attached near the middle portion of the cylindrical portion 11 of the liner 10 in the axis direction. At this time, the thermoplastic resins of the end portions of the fiber bundles 20 are heated, melted, and fused to the cylindrical portion 11 of the liner 11.

Thereafter, the fiber bundles 20 are continuously provided from the bobbins 100 while moving the liner 10 in the axis direction (direction of the arrow A) to braid them, so that the body 30 is formed on the outside of the cylindrical portion 11 and the dome portions 12. Then, when the body 30 is formed to the root portion of the mouth piece 13 of the liner 10, the liner 10 is stopped and each bobbin 100 is rotated approximately a half-turn in the circumferential direction of the liner 10.

Figure 3:
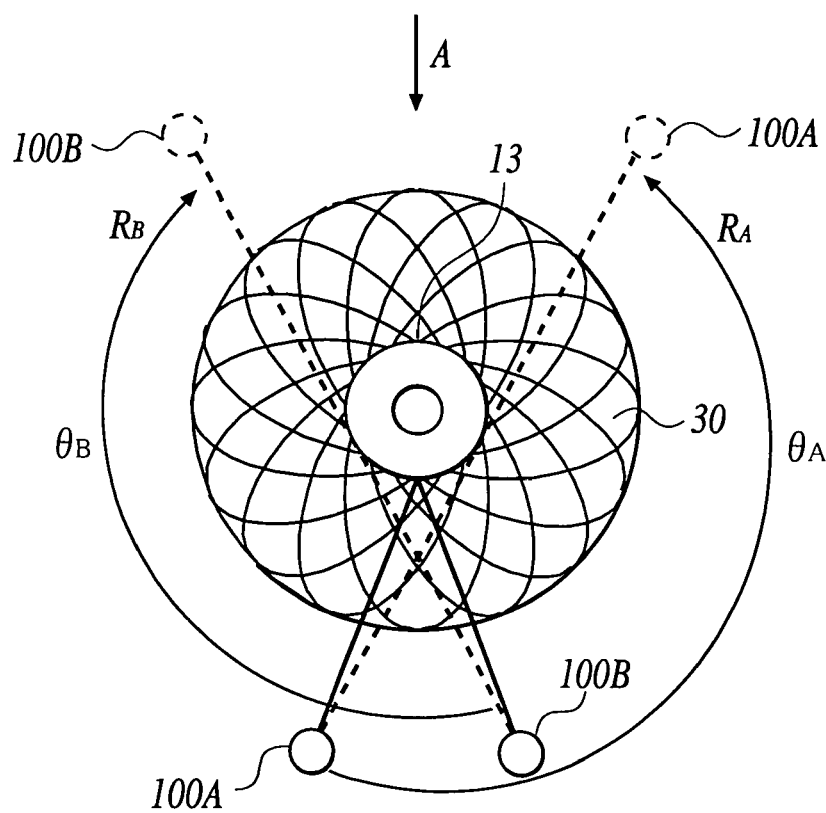
FIG. 3 is a view for explaining a rotation operation of bobbins in a circumferential direction in the body forming step of the pressure container in accordance with the invention.

The operation of each of such bobbins 10 is explained concretely by taking a bobbin 100A and a bobbin 100B, which are shown in FIG. 3, as an example. The bobbin 100A is assumed to rotate along the arrow direction of $R_A$ as shown in FIG. 3 of the body forming step and the bobbin to rotate along the arrow direction of $R_B$ as shown in FIG. 3 of the body forming step.

At the time when the body 30 is formed to the root portion of the mouth piece 13 of the liner 10, the liner 10 is stopped and the bobbin 100A is rotated only along the arrow direction of $R_A$ of FIG. 3 and at the same time, the bobbin 100B is rotated only along the arrow direction of $R_B$ of FIG. 3 (refer to FIG. 3). The value of $R_A$ ($R_B$) is a value which arranges the bobbin 101A (bobbin 100B) at a position that is approximately opposite to the position before rotation with the mouth piece 13 being interposed therebetween. The value can be set appropriately within the range of 180 degrees to 225 degrees.

After arranging each of the bobbins 100 at a position which is approximately opposite to the position before the rotation with the mouth piece 13 being interposed therebetween by rotating each of the bobbins 100 approximately a half-turn in the circumferential direction of the liner 10 as described above, formation of the body 30 is continued while moving the liner 10 in the opposite direction (direction of the arrow B). By repeating the above procedures, the body 30 with a predetermined thickness is formed on the whole outside of the cylindrical portion 11 and the dome portions 12 of the liner 10.

An annular heater (not shown in the figure) arranged around the liner 10 is used to heat the body 30 at the time of forming the body 30 in the body forming step, so that the thermoplastic resins which are braided into the fiber bundles 20 are melted. Thereafter, the thermoplastic resins are cured by natural cooling to form an outer shell made of fiber reinforced composite material (resin curing step). A pressure container can be obtained by performing the above steps.

In the manufacturing method in accordance with the explained above embodiment, in the step to form the body 3 on the out periphery of the liner by providing the fiber bundles 20 from the bobbins 100 of the braiders while reciprocating the liner 10 in the axial direction, the moving of the liner 10 is stopped when the forming position of the body 30 reaches the root portion of the mouth piece 13 of the liner 10. Then after by rotating each of the bobbins in the circumferential direction of the liner 10 to arrange each of the bobbins 100 at a position that is approximately opposite to the position before rotation with the mouth piece 13 being interposed therebetween, the formation of the body 30 is continued in the opposite axial direction of the liner 10.

For this reason, like the helical winding system of the FW method, the braiding can be carried out in such a way that the fiber bundles 20 are wound to the dome portion 20 of the liner 10, eliminating the need to cut off the fiber bundles 20 and the need to crook the fiber bundles 20 so as to be folded back when reversing the moving direction of the liner 10. As a result, it is possible to reinforce the strength of the outer shell of the fiber reinforced composite material, further making it possible to reinforce the strength of the tank.

In the above embodiment, the example was made where liquid crystal resin is used to prepare the liner 10, however, the material to form the liner 10 is not limited to liquid crystal resin. For example, other synthetic resin having gas barrier property such as high-density polyethylene or the like, or metallic material such as aluminum base alloy or the like may also used to prepare the liner 10. In the above embodiment, the example was made where the liner 10 is molded by the blow molding method, however, the liner 10 may be molded by adopting an injection molding method or the like.

In the manufacturing method according to the embodiment, the example was made where the fiber bundles 20 are prepared by using carbon fibers, however, they may be prepared by using other reinforce fibers such as glass fibers, aramid fibers or the like. The outer portion of the carbon fibers forming the fiber bundles 20 may be protected by covering them with glass fibers or the like.

In addition, in the above embodiment, the example was made where the fibrous thermoplastic resin is impregnated into the fiber bundles 20 and the thermoplastic resin is heated to cure. However, it is also possible to form the body 30 by using a fiber bundle where resin is not impregnated therein, and impregnating a thermosetting resin into the fiber bundles by immersing the body 30 into the thermosetting resin. Thereafter heat the impregnated thermosetting resin so as to be cured.

The entire disclosure of Japanese Patent Application No. 2003-345856 filed on Oct. 3, 2003 including specification, claims, drawings and summary is incorporated herein by reference in its entirety.

What is claimed is:

1. A pressure container manufacturing method for manufacturing a pressure container by forming an outer shell made of a fiber reinforced composite material on an outer periphery of a liner which has a cylindrical portion, dome portions connected to both ends of the cylindrical portion, and a mouth piece disposed on a top of at least one of the dome portions, comprising:

forming a body on the periphery of the liner by braiding a fiber bundle provided from a plurality of bobbins of a braider which is disposed in a circumferential direction of the liner, while moving the liner in an axial direction, wherein when a forming position of the body reaches a root portion of the mouth piece of the liner, a movement in a first direction of the liner is stopped, each of the bobbins is rotated approximately a half-turn in the circumferential direction of the liner, and thereafter formation of the body is continued while moving the liner in a second direction opposite to the first direction; and curing a resin which is impregnated in the fiber bundle, to form an outer shell.

2. The method as claimed in claim 1, wherein the resin is a thermoplastic resin.

3. The method as claimed in claim 1, wherein the resin is a thermosetting resin.

4. The method as claimed in claim 2, wherein the thermoplastic resin is any one of a polyimide, a polyphenylene sulfite and a poly ethylene terephthalate.

5. The method as claimed in claim 1, wherein the liner comprises any one of a liquid crystal resin, a synthetic resin and a metallic material.

6. The method as claimed in claim 1, wherein the fiber bundle comprises any one of a carbon fiber, a glass fiber and an aramide fiber.

7. The method as claimed in claim 1, wherein the half-turn is in a range between 180 degrees and 225 degrees, which interposes the mouth piece.

8. The method as claimed in claim 1, wherein the fiber bundle is continuously braided in the forming a body on the outer shell of the liner.

* * * * *